United States Patent [19]

Menniti

[11] Patent Number: 4,723,191

[45] Date of Patent: Feb. 2, 1988

[54] ELECTRONIC VOLTAGE REGULATOR FOR USE IN VEHICLES WITH PROTECTION AGAINST TRANSIENT OVERVOLTAGES

[75] Inventor: Pietro Menniti, Milan, Italy

[73] Assignee: SGS Microelecttronica SpA, Agrate Brianza, Italy

[21] Appl. No.: 787,376

[22] Filed: Oct. 15, 1985

[30] Foreign Application Priority Data

Oct. 31, 1984 [IT] Italy ............................ 23420 A/84

[51] Int. Cl.$^4$ ............................................ H02H 3/24

[52] U.S. Cl. ...................................... 361/92; 361/91; 361/111; 361/21; 330/298

[58] Field of Search ............... 323/276, 278, 289, 303; 361/18, 20, 21, 86, 91, 111, 84, 92; 307/127; 330/298, 207 P

[56] References Cited

U.S. PATENT DOCUMENTS

| | | | |
|---|---|---|---|
| 3,048,718 | 8/1962 | Starzec | 323/303 |
| 3,078,410 | 2/1963 | Thomas | 361/18 |
| 3,109,980 | 11/1963 | Wiley | 361/18 |
| 3,571,608 | 3/1971 | Hurd | 361/91 |
| 4,186,418 | 1/1980 | Seiler | 361/111 |
| 4,302,792 | 11/1981 | Harwood | 361/92 |
| 4,455,585 | 6/1984 | Murari | 361/111 |

FOREIGN PATENT DOCUMENTS 2558535 7/1976 Fed. Rep. of Germany ........ 361/20

OTHER PUBLICATIONS

"Low Drop Regulator with Overvoltage Protection and Reset Function for Automotive Environment", Pietro Menniti and Sandro Storti; IEEE Journal of Solid-State Circuits, vol. sc-19, No. 3, 1984; pp. 442-448.

*Primary Examiner*—G. P. Tolin
*Assistant Examiner*—H. L. Williams
*Attorney, Agent, or Firm*—Wenderoth, Lind & Ponack

[57] ABSTRACT

A voltage regulator includes an output power element and protection circuit connected to a control terminal of the power element in such a way as to cause the element to conduct in a direction opposite to that of normal operation, when the transient overvoltages of polarity opposite to that of the generator reach a predetermined value. The energy associated with the transient is thus discharged via the output power device and it is not therefore necessary to use additional power components to carry out this function, leading to reductions in size and production costs.

8 Claims, 2 Drawing Figures

ELECTRONIC VOLTAGE REGULATOR FOR USE IN VEHICLES WITH PROTECTION AGAINST TRANSIENT OVERVOLTAGES

BACKGROUND OF THE INVENTION

The present invention relates to electronic voltage regulators, and in particular to electronic voltage regulators for use with automobile vehicles, of the type having the output power stage ("pass" stage) formed by a vertical, insulated collector, bipolar PNP transistor.

An electronic voltage regulator is inserted between the generator and the load, formed by the other electronic devices of the vehicle, in order to obtain a continuous supply voltage which is independent of the current absorbed by the load itself.

A regulator must absorb all the electrical stresses reaching its input and must suppress them at its output. It must, in particular, withstand the dangerous positive and negative overvoltages occurring in the electrical circuit of the vehicle, protecting both itself and the load. A strong negative voltage pulse is generated, for example, during the decay transient of the alternator field ("field decay") when the main circuit switch (ignition key) is opened while inductive loads (alternator field winding, ignition, electric motors) are connected to the regulator. An electronic regulator should withstand the high negative overvoltages by behaving as an open switch.

For applications in which a comparatively high output current is required, use is made of an electronic regulator whose output power stage is formed by a bipolar PNP power transistor. This regulator has a high supply efficiency since the relative minimum input-output voltage drop ("drop-out") is equal to the collector-emitter saturation voltage ($V_{CESAT}$) of the PNP transistor which is the minimum drop-out which may be obtained in the current state of the art.

The PNP transistor used as the output stage may be a lateral PNP transistor or a vertical, insulated collector, PNP transistor. The latter has a greater current density than the former and has a higher current gain, making its use advantageous since it occupies a smaller area of silicon and supplies a higher current to the regulator output.

However, a vertical, insulated collector, PNP transistor has a reverse breakdown voltage of its base-emitter junction ($V_{EBO}$) which is considerably lower than that of a lateral PNP transistor, and as a result thereof, it is unable to withstand high negative overvoltages by behaving as an open switch. These overvoltages in fact cause the breakdown of its base-emitter junction.

In electronic regulators having their power stage formed by a vertical, insulated collector, PNP transistor, in order to prevent the destruction of the transistor in the case of strong negative overvoltages, a protection circuit, which limits these overvoltages, is usually inserted, an embodiment of which is described below. However, this protection circuit occupies a very large area equivalent to the area occupied by the PNP power transistor, as a result of which it is comparatively costly and it is not economically viable to provide both the power components, i.e. the PNP transistor and its protection circuit, and the remaining components of the regulator in a single integrated circuit.

SUMMARY OF THE INVENTION

The object of the present invention is to provide an electronic voltage regulator of the type having its output power stage formed by a vertical, insulated collector, PNP transistor provided with protection against negative overvoltages, which occupies a much smaller area with respect to conventional protection devices and which is therefore economically advantageous.

This object is achieved by the electronic voltage regulator set out and characterized in the attached claims.

This object may be achieved by providing in an electronic voltage regulator having an input terminal connected to a voltage source which supplies a voltage of a first type of polarity with respect to a ground terminal, an output terminal connected to a load and a terminal common to the input and output and connected to said ground terminal and comprising: a regulation control stage having first and second input terminals and an output terminal, a feedback circuit means connected to said output terminal of said regulator and to said first input terminal of said regulation control stage, an output power device having first and second terminals respectively connected to said input and output terminals of said regulator and having a control terminal connected to said output terminal of said regulation control stage, the improvement comprising: a means for protecting against transient overvoltages of an opposite polarity to said first type of polarity, said protection means being connected to said control terminal of said output power device so as to cause said output power device to conduct in a direction opposite to that of normal operation when said transient overvoltages of an opposite polarity reach a predetermined value.

BRIEF DESCRIPTION OF THE DRAWINGS

The invention is described in detail below purely by way of non-limiting example with reference to the attached drawings, in which.

The same reference numerals and letters are used in both FIGS. 1 and 2 for corresponding components.

DESCRIPTION OF THE PREFERRED EMBODIMENT

Figure 1:
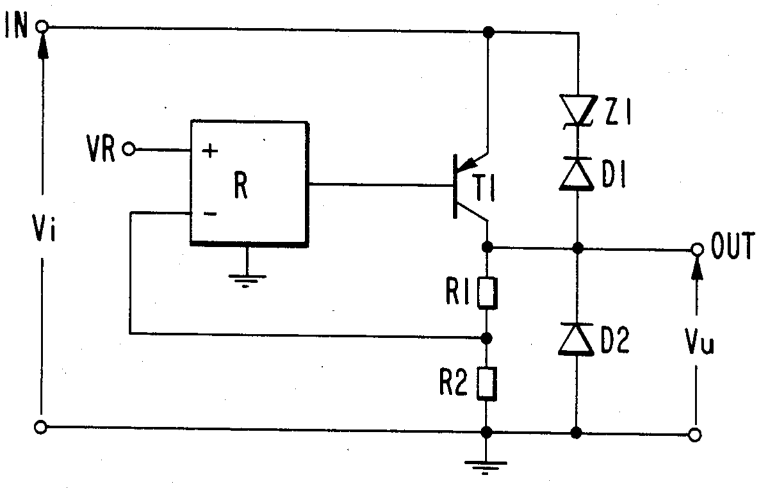
FIG. 1 PRIOR ART
FIG. 1 shows a simplified circuit diagram of a voltage regulator provided with protection against negative overvoltages of a known type.

The circuit shown in FIG. 1 has an input terminal IN for connection to a generator which supplies a positive voltage with respect to ground, an output terminal OUT for connection to a load and a terminal common to the input and output for connection to ground.

This circuit comprises an output power device formed by a bipolar PNP power transistor T1 of a vertical, insulated collector, type having its emitter and its collector connected to the input terminal IN and the output terminal OUT respectively. The transistor T1 is base controlled by a regulation stage, shown by a block R in FIG. 1. This regulation stage is constructed in a way known to persons skilled in the art and is therefore not shown in FIG. 1 for simplicity. It is conventionally formed by a differential amplifier which controls a bipolar NPN transistor designed to drive the bipolar PNP transistor as shown, for example, in FIG. 3, page 444, of the article entitled "Low Drop Regulator with Overvoltage Protection and Reset Function for Automotive Environment", by P. Menniti and S. Storti, published in: "IEEE Journal of Solid-State Circuits," Vol. SC-19, No. 3, June 1984.

The regulation stage R has two input terminals, i.e. an inverting terminal (−) and a non-inverter terminal (+), an output terminal and a terminal for connection to ground. The inverting input terminal is connected to the output terminal OUT via a resistance R1 and to ground via a resistance R2. A reference voltage VR is supplied to the non-inverting input. The output terminal of stage R is connected to the base of T1.

The circuit of FIG. 1 also comprises a Zener power diode Z1, a first power diode D1 and a second power diode D2 connected in series. More specifically, the anode of Z1 is connected to the input terminal IN; the cathodes of Z1 and D1 are connected together; the anode of D1 and the cathode of D2 are connected together to the output terminal OUT and the anode of D2 is connected to ground.

As known to persons skilled in the art, a voltage Vu is produced between the output terminal OUT and ground, the value of this voltage only depending on the input voltage Vi and the load connected to the output terminal when the voltage Vi is lower than a predetermined threshold value which is characteristic of the circuit, above which value there is produced as output a continuous voltage VO whose value is independent of both the input voltage Vi and the load and only depends on the reference voltage VR and the parameters of the circuit itself, in particular the ratio between the resistances R1 and R2. In effect, beyond this threshold value which defines the lower limit of the range of correct operation (and therefore also of possible use) of the regulator, the regulation stage R operates in a stable manner. It compares the reference voltage VR with a fraction of the output voltage Vu obtained by means of the divider R1 and R2 and if the output voltage varies from the predetermined value VO, it drives the transistor T1 to a conduction level such as to reset the load voltage to a voltage having the value VO.

During normal operation of the regulator, the transistor T1 is operative, whereas the diode D1 is reverse biased as a result of which the Zener diode Z1 does not become conductive. In this situation the diode D2 is also inoperative.

The Zener diode Z1 has a trigger voltage lower than the reverse breakdown voltage of the base-emitter junction of T1 as a result of which it protects T1 against negative overvoltages. In fact, during the transients in which negative overvoltages are produces, the transistor T1 is inoperative and when the voltage between its collector and emitter ($V_{CE}$) becomes equal to the sum of the trigger voltage of Z1 and the threshold voltage of D1, these components start to conduct and discharge the energy associated with the transients, thus preventing the overvoltages from reaching values likely to cause the breakdown of the base-emitter junction of T1. The diode D2 also starts to conduct, as a result of which the discharge current passes through D1 instead of the load and the resistive divider R1 and R2.

Protection circuitry for use against negative overvoltages of the type described above must withstand comparatively high currents and consequently occupy a vary large area and is not economically viable.

The above problems are solved, in accordance with the present invention, by inserting in the regulator, a protection circuit formed by a tripper circuit designed to drive the PNP transistor T1 into reverse conduction when the negative overvoltage reaches a predetermined value lower than the value causing the breakdown of the base-emitter junction of T1. The energy associated with the transient is thus discharged via the transistor T1 and additional power components are not needed.

Figure 2:
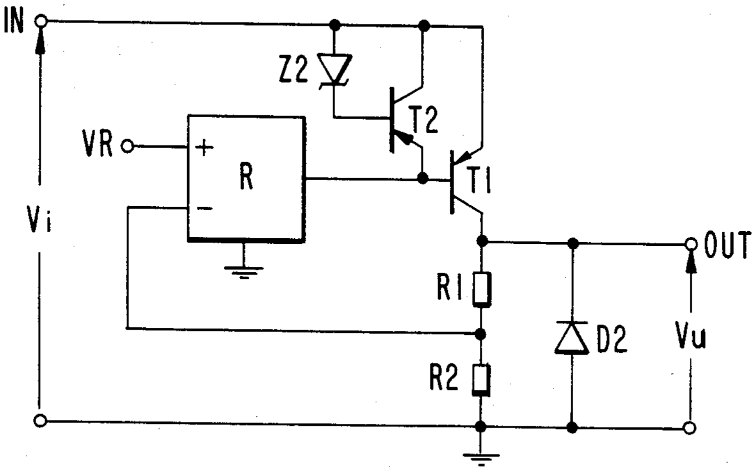
FIG. 2 shows a simplified circuit diagram of a voltage regulator provided with protection against negative overvoltages constructed in accordance with the present invention.

The circuit of the present invention, shown in FIG. 2, comprises a tripper circuit formed by a Zener diode Z2 and by a PNP transistor T2. Diode Z2 has its anode and cathode respectively connected to the input terminal IN of the regulator and the base of T2, and T2 has its collector and emitter respectively connected to the emitter and base of T1.

During normal operation of the regulator, Z2 and T2 are inoperative.

When negative voltage transients are produced, the transistor T1 remains inoperative until the voltage between the cathode and the anode of Z2 is lower than the tripper value. Beyond this value Zener diode Z2 conducts and drives the transistor T1 and therefore the transistor T2 into conduction. The base-emitter junction of T1 is reverse biased while its base-collector junction is forwardly biased with the result that the transistor operates in its reverse conduction region.

A transistor operates in its reverse conduction region when it is so biased that the functions of its emitter and its collector are reversed. In the circuit of FIG. 2 according to the invention, transistor T1 operates in its reverse conduction region during a negative overvoltage which is higher than the Zener voltage of diode Z2. In this condition the base-to-emitter junction of transistor T1 is reverse biased, becaused the base is less negative than the negative than the emitter, and the base-to-collector junction of T1 is forward biased because the collector is less negative than the base.

Transistor T1 will then operate with its electrode, which is the emitter electrode during the normal operation of the regulator, i.e. in the absence of the negative overvoltage, acting as its collector and with its electrode, which is the collector electrode during the normal operation of the regulator, acting as its emitter.

The tripper voltage of Z2 is selected so as to cause T1 to come into conduction in its reverse conduction region before its base-emitter voltage reaches the breakdown value $V_{EBO}$.

The transistors T1 and T2 are connected together so as to provide a Darlington configuration when T1 is operating in its reverse conduction region. As known, this configuration provides a high current gain with the result that a comparatively small current is sufficient to drive the base of T2. A current of negligible value with respect to the currents passing through the components Z1 and D1 of FIG. 1 therefore passes through the Zener diode Z2. The transistor T2 also has to withstand a current with a lower value than the above-mentioned components.

Protection circuitry of the type shown in FIG. 2 may be simply constructed and, since it has to dissipate less power, occupies a smaller area than the protection of the type shown in FIG. 1 with the result that it costs less and may be integrated together with the remaining components of the regulator.

Although in the embodiment of the invention shown in FIG. 2, the protection against negative overvoltages comprises a single Zener diode, it may also comprise a plurality of series-connected Zener diodes depending on the tripper voltage desired. In addition, many further modifications and variants may be made to the trigger circuit described above without departing from the scope of the present invention.

I claim:

1. In an electronic voltage regulator having an input terminal connected to a voltage source which supplies a voltage of a first type of polarity with respect to a ground terminal, an output terminal connected to a load and a terminal common to the input and output and connected to said ground terminal and comprising: a regulation control stage having first and second input terminals and an output terminal, a feedback circuit means connected to said output terminal of said regulator and to said first input terminal of said regulation control stage, an output power device having first and second terminals respectively connected to said input and output terminals of said regulator and having a control terminal connected to said output terminal of said regulation control stage, the improvement comprising: a protection means for protecting against transient overvoltages of an opposite polarity to said first type of polarity, said protection means being connected to said control terminal of said output power device so as to cause said output power device to conduct in a direction opposite to that of normal operation when said transient overvoltages of an opposite polarity reach a predetermined value and so as to dissipate the power of said transient overvoltages.

2. A regulator as claimed in claim 1, wherein said output power device comprises a power transistor having its base connected to said control terminal of said regulation control stage and operating in its reverse region when conducting in said direction opposite to that of normal operation, and wherein said protection means comprises a semiconductor circuit means inserted between said input terminal of said regulator and said output power device so as to begin to conduct when said transient overvoltages of an opposite polarity reach said predetermined value.

3. A regulator as claimed in claim 2, wherein said protection means comprises a transistor having its base connected to said semiconductor circuit means and its collector and emitter respectively connected to an emitter and said base of said power transistor.

4. A regulator as claimed in claim 2, wherein said semiconductor circuit means comprises at least one Zener diode which is reverse biased when said transient overvoltages of an opposite polarity occur.

5. A regulator as claimed in claim 3, wherein said power transistor comprises a bipolar PNP transistor, whose emitter and collector form said first and second terminals of said output power device, and wherein said transistor included in said protection means comprises a bipolar PNP transistor.

6. In an electronic voltage regulator having an input terminal connected to a voltage source which supplies a voltage of a first type of polarity with respect to a ground terminal, an output terminal connected to a load and a terminal common to the input and output and connected to said ground terminal and comprising: a regulation control stage having first and second input terminals and an output terminal, a feedback circuit means connected to said output terminal of said regulator and to said first input terminal of said regulation control stage, an output power device having first and second terminals respectively connected to said input and output terminals of said regulator and having a control terminal connected to said output terminal of said regulation control stage, the improvement comprising: a protection means for protecting against transient overvoltages of an opposite polarity to said first type of polarity, said protection means being connected to said control terminal of said output power device so as to cause said output power device to conduct in a direction opposite to that of normal operation when said transient overvoltages of an opposite polarity reach a predetermined value;

wherein said output power device comprises a power transistor having its base connected to said control terminal of said regulation control stage and operating in its reverse region when conducting in said direction opposite to that of normal operation, and wherein said protection means comprises a semiconductor circuit means inserted between said input terminal of said regulator and said output power device so as to begin to conduct when said transient overvoltages of an opposite polarity reach said predetermined value;

wherein said protection means comprises a transistor having its base connected to said semiconductor circuit means and its collector and emitter respectively connected to an emitter and said base of said power transistor.

7. In an electronic voltage regulator having an input terminal connected to a voltage source which supplies a voltage of a first type of polarity with respect to a ground terminal, an output terminal connected to a load and a terminal common to the input and output and connected to said ground terminal and comprising: a regulation control stage having first and second input terminals and an output terminal, a feedback circuit means connected to said output terminal of said regulator and to said first input terminal of said regulation control stage, an output power device having first and second terminals respectively connected to said input and output terminals of said regulator and having a control terminal connected to said output terminal of said regulation control stage, the improvement comprising: a protection means for protecting against transient overvoltages of an opposite polarity to said first type of polarity, said protection means being connected to said control terminal of said output power device so as to cause said output power device to conduct in a direction opposite to that of normal operation when said transient overvoltages of an opposite polarity reach a predetermined value;

wherein said output power device comprises a power transistor having its base connected to said control terminal of said regulation control stage and operating in its reverse region when conducting in said direction opposite to that of normal operation, and wherein said protection means comprises a semiconductor circuit means inserted between said input terminal of said regulator and said output power device so as to begin to conduct when said transient overvoltages of an opposite polarity reach said predetermined value;

wherein said semiconductor circuit means comprises at least one Zener diode which is reverse biased when said transient overvoltages of an opposite polarity occur.

8. A regulator as claimed in claim 6, wherein said power transistor comprises a bipolar PNP transistor, whose emitter and collector form said first and second terminals of said output power device, and wherein said transistor included in said protection means comprises a bipolar PNP transistor.

* * * * *